United States Patent
Sagen et al.

(10) Patent No.: US 10,527,732 B2
(45) Date of Patent: Jan. 7, 2020

(54) VERIFICATION OF TIME SOURCES

(71) Applicant: Schweitzer Engineering Laboratories, Inc., Pullman, WA (US)

(72) Inventors: Eric A. Sagen, Pullman, WA (US); Mark L. Zeller, Pullman, WA (US); Bogdan Z. Kasztenny, Markham (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 331 days.

(21) Appl. No.: 15/429,013

(22) Filed: Feb. 9, 2017

(65) Prior Publication Data

US 2018/0224558 A1 Aug. 9, 2018

(51) Int. Cl.
*G01S 19/03* (2010.01)
*G01S 19/01* (2010.01)
*G04F 1/00* (2006.01)
*G01S 19/39* (2010.01)

(52) U.S. Cl.
CPC .............. *G01S 19/03* (2013.01); *G01S 19/01* (2013.01); *G01S 19/39* (2013.01); *G04F 1/005* (2013.01)

(58) Field of Classification Search
CPC .......... G01S 19/03; G01S 19/01; G01S 19/39; G04F 1/00
USPC ............................ 342/357.4, 357.22, 357.39
See application file for complete search history.

(56) References Cited

U.S. PATENT DOCUMENTS

| | | | |
|---|---|---|---|
| 5,160,926 A | 11/1992 | Schweitzer, III | |
| 5,557,284 A | 9/1996 | Hartman | |
| 5,737,715 A | 4/1998 | Deaton | |
| 6,144,334 A | 11/2000 | Claffey | |
| 6,229,479 B1 | 5/2001 | Kozlov | |

(Continued)

FOREIGN PATENT DOCUMENTS

| | | |
|---|---|---|
| WO | 9747987 | 12/1997 |
| WO | 2012151006 | 11/2012 |
| WO | 2014005016 | 1/2014 |

OTHER PUBLICATIONS

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

(Continued)

*Primary Examiner* — Chuong P Nguyen
(74) *Attorney, Agent, or Firm* — Jared L. Cherry; Bradley W. Schield

(57) ABSTRACT

This disclosure relates to systems and methods for verification of time sources. In various embodiments, one or more secondary time sources may be used to verify the accuracy of a primary time source prior to relying on a time signal created by the primary time source. In one embodiment, a first interface is configured to receive the primary time signal from a primary time source, and a second interface in communication with a secondary time source is configured to receive a secondary time signal. A time assessment subsystem is configured to determine an occurrence of a verification criteria. Upon the occurrence of the verification criteria, the system may compare the primary time signal and the secondary time signal to determine whether that the primary time signal is consistent with the secondary time signal. If the signal is consistent, the primary time source may be utilized by the system.

21 Claims, 3 Drawing Sheets

(56) References Cited

U.S. PATENT DOCUMENTS

| | | |
|---|---|---|
| 6,483,856 B1 | 11/2002 | Bird |
| 7,146,516 B2 | 12/2006 | Dhupar |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,606,541 B1 | 10/2009 | Nicholls |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 8,055,288 B2 | 11/2011 | Ladd |
| 8,138,972 B2 | 3/2012 | Underbrink |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,446,896 B2 | 5/2013 | Bedrosian |
| 8,564,330 B1 | 10/2013 | Radulov |
| 8,655,608 B2 | 2/2014 | Guzman-Casillas |
| 8,867,520 B2 | 10/2014 | Nicholls |
| 9,083,503 B2 | 7/2015 | Sagen |
| 9,270,442 B2 | 2/2016 | Rice |
| 9,319,100 B2 | 4/2016 | Achanta |
| 9,425,652 B2* | 8/2016 | Rippon ............... H02J 13/0013 |
| 9,590,411 B2* | 3/2017 | Achanta ............... H02H 1/0061 |
| 9,599,719 B2* | 3/2017 | Achanta ............... G01S 19/20 |
| 9,760,062 B2* | 9/2017 | Achanta ............... G04F 10/10 |
| 10,122,487 B2* | 11/2018 | Whitehead ............... G06F 1/14 |
| 10,379,500 B2* | 8/2019 | Achanta |
| 2002/0136172 A1 | 9/2002 | Chun |
| 2002/0158693 A1 | 10/2002 | Soong |
| 2002/0167934 A1 | 11/2002 | Carter |
| 2003/0087654 A1 | 5/2003 | Wheeler |
| 2003/0107513 A1 | 6/2003 | Abraham |
| 2004/0062279 A1 | 4/2004 | Primrose |
| 2004/0166879 A1 | 8/2004 | Meadows |
| 2004/0228368 A1 | 11/2004 | Jecmen |
| 2006/0259806 A1 | 11/2006 | Zweigle |
| 2007/0132773 A1 | 6/2007 | Plante |
| 2007/0194987 A1 | 8/2007 | Fedora |
| 2008/0062039 A1 | 3/2008 | Cohen |
| 2008/0169978 A1 | 7/2008 | Powell |
| 2008/0186229 A1 | 8/2008 | Van Diggelen |
| 2008/0198069 A1 | 8/2008 | Gronemeyer |
| 2009/0117928 A1 | 5/2009 | Ladd |
| 2009/0160705 A1 | 6/2009 | Matsuzaki |
| 2009/0315764 A1 | 12/2009 | Cohen |
| 2010/0030916 A1 | 2/2010 | Greenwood Graham |
| 2010/0034190 A1 | 2/2010 | Yun |
| 2010/0073228 A1 | 3/2010 | Smith |
| 2010/0117899 A1 | 5/2010 | Papadimitratos |
| 2010/0127928 A1 | 5/2010 | Thomson |
| 2010/0190509 A1 | 7/2010 | Davis |
| 2010/0222068 A1 | 9/2010 | Gaal |
| 2010/0231445 A1 | 9/2010 | Tarlow |
| 2010/0231448 A1 | 9/2010 | Harper |
| 2010/0253578 A1 | 10/2010 | Mantovani |
| 2010/0254225 A1 | 10/2010 | Schweitzer, III |
| 2011/0001668 A1 | 1/2011 | Cobb |
| 2011/0035066 A1* | 2/2011 | Schweitzer, III ... H02J 13/0062 700/286 |
| 2011/0068973 A1 | 3/2011 | Humphreys |
| 2011/0085540 A1 | 4/2011 | Kuwabara |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1 | 11/2011 | Harper |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0116677 A1 | 5/2012 | Higgison |
| 2012/0179404 A1* | 7/2012 | Lee ............... H04J 3/0688 702/66 |
| 2012/0182181 A1 | 7/2012 | Dai |
| 2012/0195253 A1 | 8/2012 | Irvine |
| 2012/0195350 A1 | 8/2012 | Das |
| 2012/0323397 A1 | 12/2012 | Schweitzer, III |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0094218 A1 | 4/2014 | Hammes |
| 2014/0100702 A1 | 4/2014 | Schweitzer |
| 2014/0232595 A1 | 8/2014 | Rife |
| 2014/0250972 A1* | 9/2014 | Achanta ............... G01S 19/13 73/1.43 |
| 2014/0328441 A1* | 11/2014 | Sagen ............... H04L 7/0079 375/354 |
| 2014/0334477 A1 | 11/2014 | Stahlin |
| 2017/0351223 A1* | 12/2017 | Achanta ............... G04F 10/10 |

OTHER PUBLICATIONS

Moore, P., Crossley, P., GPS Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

Shepard, D., Humphreys, T., Fansler, A., "Evaluation of the Vulnerability of Phasor Measurement Units to GPS Spoofing Attacks", Oct. 2, 2011.

Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1, pp. 43-50.

* cited by examiner

VERIFICATION OF TIME SOURCES

RELATED APPLICATION (None)

TECHNICAL FIELD

This disclosure relates to systems and methods for verification of time sources. More particularly, but not exclusively, the present disclosure relates to use of one or more secondary time sources to verify the accuracy of a primary time source prior to relying on a time signal created by the primary time source.

BRIEF DESCRIPTION OF THE DRAWINGS

Non-limiting and non-exhaustive embodiments of the disclosure are described, including various embodiments of the disclosure with reference to the figures included in the detailed description.

DETAILED DESCRIPTION

Figure 1:
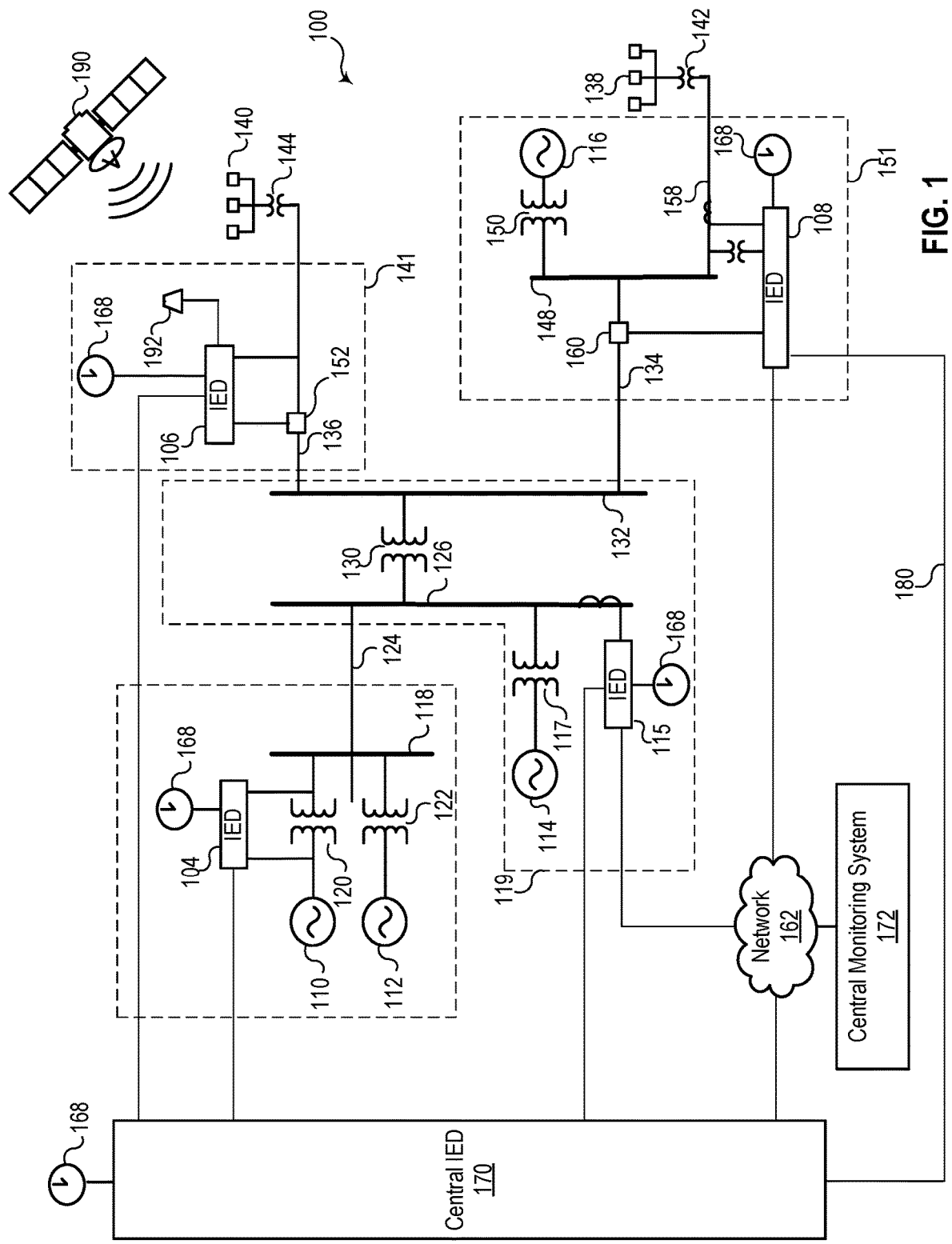
FIG. 1 illustrates a simplified one-line diagram of an electric power transmission and distribution system configured to utilize one or more secondary time sources to verify the accuracy of a primary time source consistent with embodiments of the present disclosure.

High-accuracy time sources may be utilized in a variety of applications, such as telecommunications, aerospace, automation, electric power generation and distribution, etc. Several specific examples disclosed herein relate specifically to electrical power transmission and distribution systems; however, the present disclosure is broadly applicable to any application that utilizes high-accuracy time synchronization. For example, telecommunications applications (e.g., cellular telephone base states), radar, and scientific applications may also utilize high-accuracy time sources.

Electric power transmission and distribution systems may utilize time synchronized measurements to perform a variety of monitoring, protection, and communication tasks. In connection with certain applications, intelligent electronic devices (IEDs) and/or network communication devices may utilize time information accurate beyond the millisecond range. IEDs within a power system may be configured to perform metering, control, and protection functions that require a certain level of time precision and accuracy between one or more IEDs. For example, IEDs may be configured to calculate and communicate time-synchronized phasors (synchrophasors), which may require that the IEDs and network devices be synchronized to within nanoseconds of one other.

IEDs, network devices, and other devices in a power system may include local oscillators or may receive signals from multiple time sources. A common external time source may be used by multiple devices due to the cost of high-accuracy time sources and the needs of applications distributed across large areas. Global Navigation Satellite Systems ("GNSS"), such as the Global Positioning System ("GPS"), the GLObal NAvigation Satellite System (GLONASS) or the Galileo Satellite System, are examples of a high-accuracy time source that may be used by multiple devices that are geographically separated. In a variety of applications, a plurality of IEDs may obtain measurements of electrical conditions in one portion of an electric power system, and may associate those measurements with a time stamp derived from a high-accuracy time source. The time-stamped measurements may be time-aligned and used to analyze electrical conditions across the power system. An external time source, such as GNSS, may be more accurate and available across large areas, and therefore may be preferred over local time signals.

A time source is any device that is capable of tracking the passage of time. A variety of types of time sources are contemplated, including a voltage-controlled temperature compensated crystal oscillator (VCTCXO), a phase locked loop oscillator, a time locked loop oscillator, a rubidium oscillator, a cesium oscillator, a microelectromechanical device (MEM), and/or other device capable of tracking the passage of time.

A time signal is a representation of the time indicated by a time source. A time signal may be embodied as any form of communication for communicating time information. A wide variety of types of time signals are contemplated, including an Inter-Range Instrumentation Group (IRIG) protocol, a global positioning system (GPS), a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, and/or another time transmission protocol or system.

A power system may include a data communications network that transmits a common time reference to time dependent devices connected to the data communications network. The common time reference may be received or derived from a high-accuracy external time signal. A variety of high-accuracy time signals may be utilized, such as an Inter-Range Instrumentation Group (IRIG) protocol, a GNSS, a radio broadcast such as a National Institute of Science and Technology (NIST) broadcast, an IEEE 1588 signal, etc.

Before relying on a time source, the accuracy of the time source may be assessed using the systems and methods disclosed herein. Relying on an inaccurate time signal may result in a malfunction of systems that utilize time-sensitive information based on the time signal. Still further, the systems and methods disclosed herein may be utilized in certain embodiments, to verify the accuracy of time sources that provide a time quality indicator. For example, under the C37.118 Standard, a time quality flag may indicate the "quality" of the time being reported by the time source. The conditions under which the quality of the time signal may be considered "high" or "locked" may vary among various devices and/or may be subject to manipulation. Accordingly, various embodiments consistent with the present disclosure may be configured to verify the quality of the time signal independent of the time quality indicator provided by the time source.

A variety of circumstances may arise in which an inaccurate time source may be utilized in typical operation. For example, the inventors of the present application observed a scenario in which a primary time source, after operating for an extended period, temporarily lost a lock on an external time source. The time source eventually began sending out a time signal again; however, the time source had drifted by 80 ms during the failure and failed to send out the correct time quality. The 80 ms time discrepancy caused a transmission line current differential protective relay to trip. In another example, a temporary fault caused devices in a power substation to reset. A time source sent out an inaccurate time signal and an inaccurate time quality for a few seconds. Certain devices in the substation accepted the inaccurate time quality thus causing those devices to have different time than other devices. In addition to circumstances that may arise during typical operation, time signals may also be maliciously manipulated. In order to mitigate the potential for disruption caused by reliance on inaccurate time signals, the systems and methods consistent with the present disclosure may allow devices that receive an external time signal to verify the external time signal prior to relying on the external time signal.

Several aspects of the embodiments disclosed herein may be implemented as software modules or components. A software module or component may include any type of computer instruction or computer executable code located within a memory device and/or transmitted as electronic signals over a system bus using a wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an electric power transmission and distribution system 100 configured to utilize one or more secondary time sources to verify the accuracy of a primary time source consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136, and 158), circuit breakers (e.g., breakers 152, 160), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

In various embodiments, IEDs 104, 106, 108, 115, and 170 may be configured to monitor the frequency of alternating current waveforms, voltage levels, or other electrical conditions in system 100. Network 162 may be used to transmit information among various components in system 100, including IEDs 108, 115, 170, and central monitoring system 172. In various embodiments, network 162 may be configured to provide streaming measurements that may be analyzed consistent with the present disclosure to detect anomalies.

A common time signal may be used to time-align measurements for comparison and/or to synchronize action across system 100. Utilizing a common or universal time source may ensure that IEDs have a synchronized time signal that can be used to generate time synchronized data, such as synchrophasors. In various embodiments, the common time source may comprise a time signal from a GNSS system 190. IED 106 may include a receiver 192 configured to receive the time signal from the GNSS system 190. In various embodiments, IED 106 may be configured to distribute the time signal to other components in system 100, such as IEDs 104, 108, 115, and 170.

IED 106 may also receive a time signal from time source 168. In various embodiments, time source 168 may be either an internal time source or an external time source. The time signal from the GNSS system 190 may be the primary time source, while the time source 168 may represent a secondary time source that is used to verify the primary time source and/or may be used when the primary time source is unavailable.

Time source 168 may be used in various embodiments to assess the accuracy and/or reliability of the time signal received from GNSS system 190. As described in greater detail below, a time signal from time source 168 may be compared to a time signal from GNSS 190 at various times before the time signal from GNSS system 190 is utilized by various components in system 100. For example, an assessment may occur when there is an interruption in the receipt of the signal from GNSS system 190, when IED 106 is restarted or loses power. Further, an assessment may also occur according to a pre-established schedule. Such periodic assessments may be beneficial to identify relatively slow drift of a time signal.

In the illustrated embodiment, IED 106 may be configured to monitor and protect loads 140 and transformer 144 in addition to performing an assessment of the time signal received from GNSS 190. In various embodiments, the functionality described herein for assessing the reliability of time signals from a primary and a secondary source may be incorporated into devices that utilize the time signals. Accordingly, in various embodiments, the same device may be configured to receive the time signal, assess the reliability of the time signal, and make use of the time signal.

Figure 2:
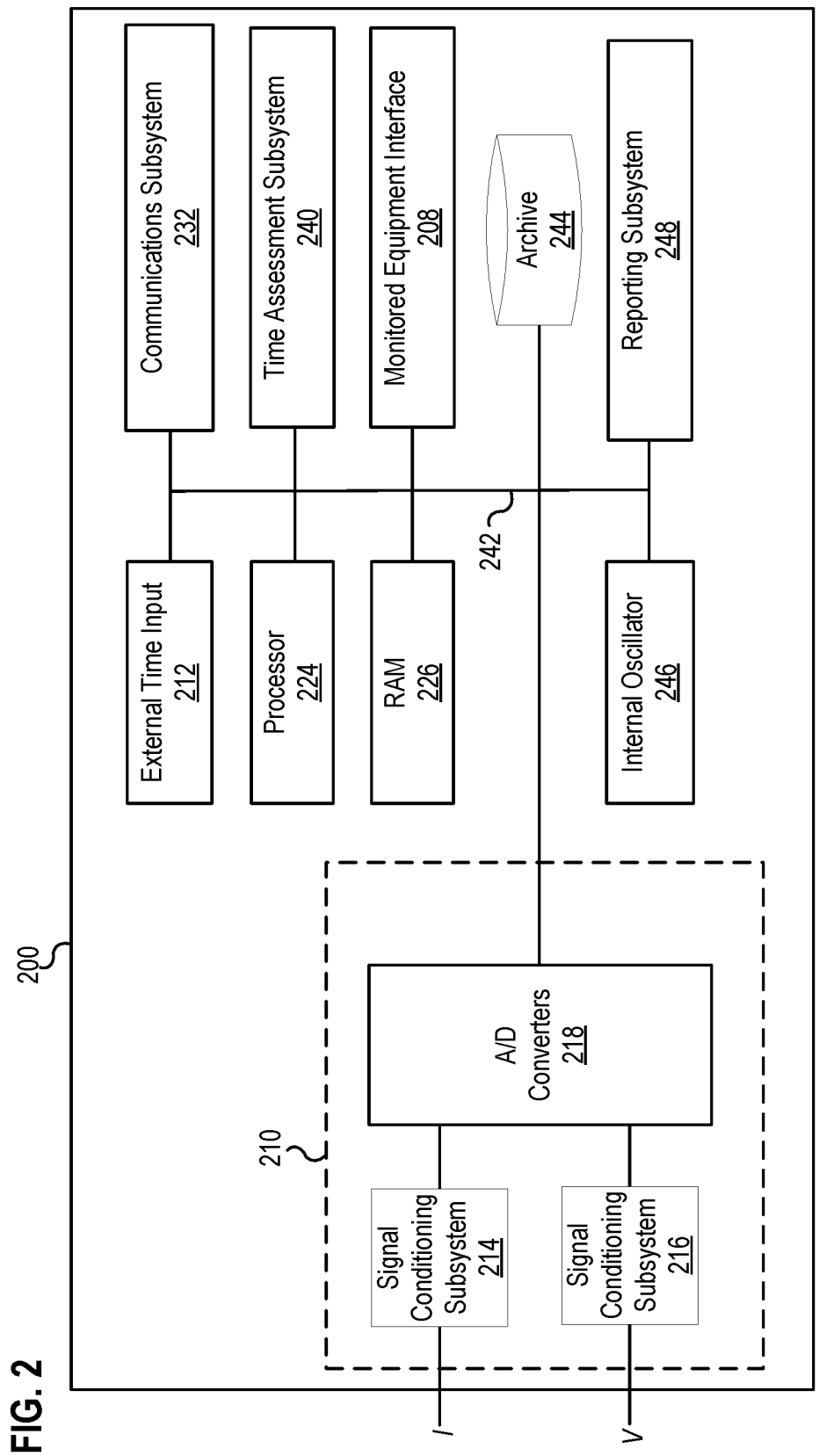
FIG. 2 illustrates a conceptual representation of a system 200 configured to rely on an external primary time source and configured to assess the external primary time source using an internal oscillator consistent with embodiments of the present disclosure.

FIG. 2 illustrates a conceptual representation of a system 200 configured to rely on an external primary time source and configured to assess the external primary time source using an internal oscillator consistent with embodiments of the present disclosure. In some embodiments, system 200 may be implemented using hardware, software, firmware, and/or any combination thereof. Moreover, certain components or functions described herein may be associated with other devices or performed by other devices. The specifically illustrated configuration is merely representative of one embodiment consistent with the present disclosure. In various embodiments system 200 may represent a device configured for use in an electric power system. For example, system 200 may represent a protective relay utilized to monitor one or more components in an electric power system, such as a transmission line, an electrical generator, an electrical bus, etc. In various embodiments, system 200 may represent a device configured to utilize the external time signal, as opposed to a device that distributes the external time signal. A device that utilizes the external time signal may be referred to as an end device or a consuming device.

A processor 224 may be configured to implement machine-executable instructions. Processor 224 may operate using any number of processing rates and architectures. Processor 224 may be configured to perform any of the various algorithms and calculations described herein. Processor 224 may be embodied as a general purpose integrated circuit, an application specific integrated circuit, a field-programmable gate array, and/or any other suitable programmable logic device. Instructions to be executed by processor 224 may be stored in random access memory 226 (RAM). A data bus 242 may facilitate communication among various components of system 200. In various embodiments, processor 224 may process information received via communications subsystem 232, external time input 212, an internal oscillator 246, a monitored equipment interface 208, and a sensor component 210. Further, processor 224 may implement instructions to coordinate the operation of the other components of system 200.

System 200 includes a communications subsystem 232 configured to communicate with other devices (not shown). The communications subsystem 232 may include a data communications interface, such as an Ethernet port. In various embodiments, information regarding system 200 may be transmitted using communications subsystem 232. Further information used by system 200 may be received using communications subsystem 232.

An external time input 212 may be configured to receive a primary time signal from an external time source. In some embodiments, the external time input 212 may comprise or be configured to couple to a GNSS receiver and to derive a primary time signal from a GNSS system. In some embodiments, an external time signal may be received using a data communication protocol, such as the precision time protocol or IEEE 1588. In such embodiments, the function of the external time input 212 may be incorporated within the communications subsystem 232.

An internal oscillator 246 may provide a secondary time signal that may be used to verify the accuracy of an external time signal. In various embodiments, the internal oscillator 246 may be compared to an external time signal (e.g., a signal received from external time input 212 or through a network time protocol sent through communications subsystem 232). In various embodiments, the internal oscillator 246 may be used to build confidence of the correct time before system 200 relies on the external time signal. In some embodiments, the external time signal may also be verified against any other information available to system 200, such as a day of year, date, or other portion of a binary-coded decimal (BCD) representation of time within the external time signal. The external time signal may not be trusted or utilized by system 200 unless the external time signal is consistent with the internal oscillator 246.

Internal oscillator 246 may be embodied in a variety of ways. For example, a variety of devices commonly used in electrical power systems and other industrial applications commonly include an internal oscillator. The internal oscillator may provide a sufficiently accurate indication of the passage of time to identify significant discrepancies associated with the external time signal, such as jumps or significantly wrong times; however, the external time signal may provide a more accurate indication of the passage of time. Accordingly, the external time signal may be used as the primary time source when it is available and has been verified against the internal oscillator 246. Alternatively, the external time signal may be used to discipline the internal oscillator. For example, the internal oscillator may be embodied as a GNSS disciplined oscillator.

In some embodiments, the functions performed by internal oscillator 246 may be performed by a secondary time source external to system 200, but independent of the primary time source. Such an external time source may be interfaced with system 200 in a variety of ways. For example, the system 200 may include a secondary time input to which a secondary external time source may be connected. Alternatively, the secondary time source may provide a secondary time signal to system 200 through the communication system 232 using the IEEE 1588 protocol.

A time assessment subsystem 240 may be configured to compare the external time signal to the internal oscillator 246 to identify significant discrepancies associated with the external time signal. In various embodiments, the time assessment subsystem may be configured to verify the quality of the external time signal at various times. For example, the quality of the external time signal may be verified following a disruption in receipt of the external time signal, when system 200 starts, or based on a pre-established schedule.

An archive 244 may contain information regarding the characteristics of an external time source and/or the internal oscillator 246. Information regarding the time sources may be collected during periods of typical operation. Such information may then be used by time assessment subsystem 240 to assess the quality of the external time source. In some embodiments, archive 244 may contain statistical information relating to the external time source and the internal oscillator, such as a drift rate, an Allan Variance, jitter, stability, etc. Information contained in archive 244 may further be utilized to improve the accuracy of the internal oscillator during periods when the external time signal is unavailable. For example, system 200 may correct for a known drift of the internal oscillator 246 that is determined during periods of typical operation.

A reporting subsystem 248 may be configured to record and report various operations relating to the verification of an external time source. For example, the reporting subsystem 248 may be configured to create an entry in an event log when verification of the primary time source fails. The event log may be stored in archive 244, and may be accessible to an operator. In some embodiments, the reporting subsystem 248 may further be configured to notify an operator of the failure. The notification may be communicated through communications subsystem 232, and may be sent in a variety of formats. For example, the notification may consist of an alarm sent to a central monitoring system, an email message sent to an operator, an SMS message sent to an operator, etc.

In certain embodiments, system 200 may include a sensor component 210. In the illustrated embodiment, sensor component 210 is configured to gather data directly from equipment such as a conductor in an electric power distribution system. In one specific embodiment, the conductor may be a transmission line or electrical bus in an electric power system. The sensor component 210 may include signal conditioning subsystems 214, 216 that are configured to condition the signal for use by system 200. In some embodiments, the signal conditioning subsystems 214, 216 may include transformers configured to step down a voltage or current to a suitable level for use by system 200 or filters configured to limit the bandwidth of signals. Sensor component 210 may further include A/D converters 218 that may sample and/or digitize conditioned waveforms to form corresponding digitized signals. The digitized signals may be provided to data bus 242 and accessed by other components of system 200. In one specific embodiment, the data gathered by sensor component 210 may be associated with a time stamp based on the primary time signal.

System 200 may also include a monitored equipment interface 208 configured to receive status indicators from, and issue control instructions to, a piece of monitored equipment (such as a circuit breaker, conductor, transformer, or the like). Status indicators received from and/or issue control instructions issued to monitored equipment through monitored equipment interface 208 may also be associated with a time stamp based on the primary time signal. For example, system 200 may be configured to synchronize the action of a plurality of devices across an electric power system based on the primary time signal. The monitored equipment interface 208 and the sensor component 210 may directly utilize the time information received from the primary time source. The components configured to utilize time information may be referred to herein as time signal utilization components.

Figure 3:
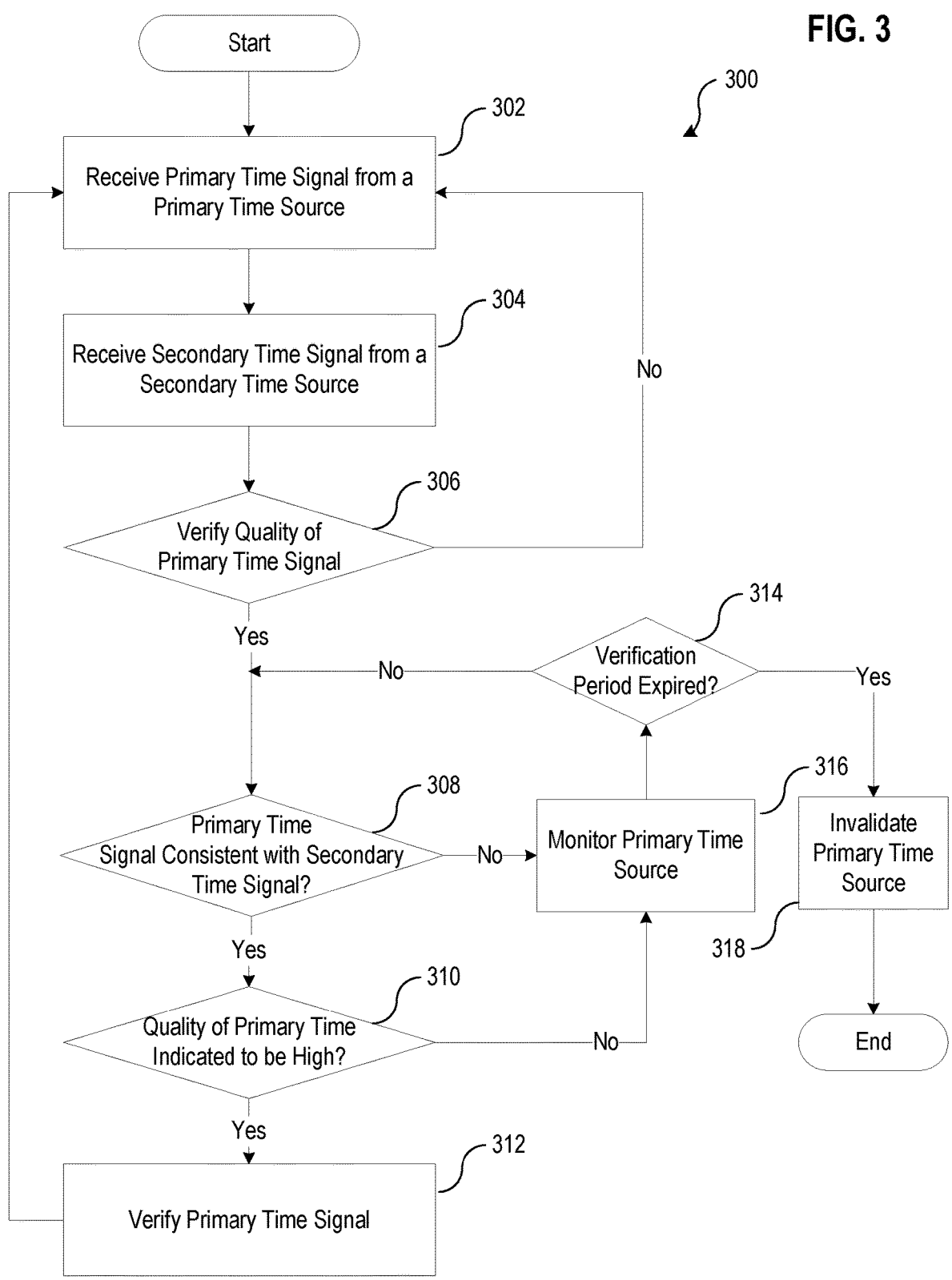
FIG. 3 illustrates a flow chart of one embodiment of a method for use of one or more secondary time sources to verify the accuracy of a primary time source consistent with embodiments of the present disclosure.

FIG. 3 illustrates a flow chart of one embodiment of a method 300 for use of one or more secondary time sources to verify the accuracy of a primary time source consistent with embodiments of the present disclosure. At 302, a primary time signal from a primary time source may be received. In various embodiments, the primary time signal may be received in a variety of ways, such as by a GNSS receiver, through a data network, etc. Further, the primary time source may comprise any external time source that may be used by a system implementing method 300. At 304, a secondary time signal may be received from a secondary time source. The secondary time source may comprise a time source that is trusted by a system implementing system 300. In some embodiments, the secondary time may be trusted because it is internal to the system implementing method 300. In other embodiments, the secondary time source may be trusted based on an alternative form of verification.

At 306, method 300 may determine whether the quality of the primary time single should be verified. In various embodiments, the primary time signal quality may be verified based on conditions associated with the system (e.g., the primary time signal is lost, the system is restarted, etc.) or based on a schedule. If the conditions are not satisfied to verify the quality of the primary time signal, method 300 may return to 302.

At 308, method 300 may determine whether the primary time signal is consistent with the secondary time. In various embodiments, the secondary time source may be compared to a primary time source. In one embodiment, a specified number of samples from the secondary time source may be accumulated to build confidence of the correct time that is compared to the primary time signal. In various embodiments, the secondary time source may provide a sufficiently accurate indication of the passage of time to identify significant discrepancies associated with the external time signal, such as jumps or significantly wrong times. If the primary time signal is not consistent with the secondary time signal, method 300 may proceed to 316.

If the primary time signal is consistent with the secondary signal, method 300 may determine at 310 whether the quality of the primary time signal is indicated to be high. In various embodiments, time sources may provide an indication of time quality. For example, certain time sources may be configured to assert certain quality bits to indicate when the time signal quality is high. If the time quality is not high at 310, method 300 may proceed to 316.

If the quality of the time signal is high, method 300 may proceed to verify the primary time signal at 312. Following verification of the primary time source, a system implementing method 300 may utilize the time signal in connection with the operation of the system. For example, in some embodiments, the time signal may be used to time-stamp measurements of electrical power systems.

At 316, method 300 may monitor the primary time source if the primary time signal is inconsistent with the secondary time signal at 308 or if the quality of the primary time is not indicated to be high at 310. The primary time source may be consistent with the secondary time signal at 308 before the quality of the primary time signal is indicated to be high. Accordingly, a verification period may be established to wait for the time quality to be high. At 314, method 300 may determine whether the verification period has expired. If the verification period has expired, at 318, the primary time source may be invalidated. In some embodiments, if the verification period has expired, a device may block protective actions based on the primary time source. Still further, in some embodiments, an alarm condition or an event log may be generated to indicate that the verification process was not successful.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) operable to monitor electrical conditions in an electric power system and to utilize an external time source, the IED comprising:
   a Global Navigation Satellite Systems (GNSS) receiver configured to receive a primary time signal;
   an internal oscillator configured to generate a secondary time signal;
   a time assessment subsystem configured to:
      determine an occurrence of a verification criteria;
      perform a comparison of the primary time signal and the secondary time signal to determine that the primary time signal is consistent with the secondary time signal;
      verify the primary time signal based on the comparison; and
   a time utilization component configured to utilize a plurality of measurements of electrical conditions associated with a corresponding plurality of time measurements based on the primary time signal to perform at least one operation after the time assessment subsystem has verified the primary time signal and to block a protective action on the electric power system based on the primary time signal when a failure to verify the primary time signal occurs.

2. The system of claim 1, wherein the GNSS receiver is configured to receive a time quality indicator associated with the primary time signal, and wherein the time assessment subsystem is configured to verify the quality of the primary time signal independent of the time quality indicator.

3. The system of claim 1, wherein the verification criteria comprises one of a disruption in receipt of the primary time signal, a start of the system, and a pre-established schedule.

4. A system configured to verify and utilize a primary time signal, the system comprising:
   a first interface configured to receive the primary time signal from a primary time source;
   a second interface in communication with a secondary time source and configured to receive a secondary time signal;
   a time assessment subsystem configured to:
      determine an occurrence of a verification criteria;
      perform a comparison of the primary time signal and the secondary time signal to determine that the primary time signal is consistent with the secondary time signal; and
      verify the primary time signal based on the comparison; and
   a time utilization component configured to utilize the primary time signal to perform at least one operation after the time assessment subsystem has verified the primary time signal and to block a protective action on the electric power system based on the primary time signal when a failure to verify the primary time signal occurs.

5. The system of claim 4, wherein the first interface is configured to receive a time quality indicator with the primary time signal, wherein the verification criteria of the time assessment subsystem is independent of the time quality indicator communicated with the primary time signal.

6. The system of claim 5, wherein the time quality indicator comprises a time quality flag under a C37.118 standard.

7. The system of claim 4, wherein the verification criteria comprises a disruption in receipt of the primary time signal.

8. The system of claim 4, wherein the verification criteria comprises a start of the system.

9. The system of claim 4, wherein the time assessment subsystem is further configured to generate an archive comprising a representation of at least one metric associated with the primary time source, and the comparison further comprises a comparison based on the at least one metric.

10. The system of claim 4, wherein the time assessment subsystem is further configured to generate an archive comprising a representation of at least one metric associated with the secondary time source, and the comparison further comprises a comparison based on the at least one metric.

11. The system of claim 4, wherein the time utilization component comprises a sensor component and the operation comprises associating a measurement of an electrical condition with a time stamp based on the primary time signal.

12. The system of claim 4, wherein the time utilization component comprises a monitored equipment interface and the operation comprises associating one of a control instruction and a status indicator with a time stamp based on the primary time signal.

13. The system of claim 4, wherein the first interface comprises a Global Navigation Satellite Systems (GNSS) receiver.

14. The system of claim 13, wherein the second interface comprises a network communications interface and the secondary time signal is provided to the network communications interface using an IEEE 1588 standard.

15. The system of claim 4, further comprising a reporting subsystem configured to generate an indication of a failure to verify the primary time signal based on the comparison.

16. A method for verifying and utilizing a primary time signal, the method comprising:
  receiving, via one or more processors of an intelligent electronic device (IED), the primary time signal from a primary time source using a first interface;
  receiving, via the one or more processors, a secondary time signal from a secondary time source using a second interface;
  determining, via the one or more processors, an occurrence of a verification criteria;
  performing, via the one or more processors, a comparison of the primary time signal and the secondary time signal and determining that the primary time signal is inconsistent with the secondary time signal;
  determining, via the one or more processors, that the primary time signal is not verified based on the comparison; and
  blocking, via the one or more processors, the IED from performing at least one operation upon failing to verify the primary time signal.

17. The method of claim 16, comprising:
  receiving, via the one or more processors, a time quality indicator communicated with the primary time signal; and
  determining, via the one or more processors, that the primary time signal is not verified independent of the time quality indicator.

18. The method of claim 16, further comprising:
  generating, via the one or more processors, an archive comprising a representation of at least one metric associated with the primary time source; and
  wherein comparing the primary time signal and the secondary time signal further comprises comparing the at least one metric to the primary time source.

19. The method of claim 16, wherein the primary time source comprises a GNSS system.

20. The method of claim 16, wherein utilizing the primary time signal to perform at least one operation after verifying the primary time signal comprises associating one of a control instruction and a status indicator with a time stamp based on the primary time signal.

21. The method of claim 16, wherein utilizing the primary time signal to perform at least one operation after verifying the primary time signal comprises associating a measurement of an electrical condition with a time stamp based on the primary time signal.

* * * * *